United States Patent
Balakrishnan et al.

(10) Patent No.: US 12,079,511 B2
(45) Date of Patent: Sep. 3, 2024

(54) DEVICES AND METHODS FOR OPTIMIZED FETCHING OF MULTILINGUAL CONTENT IN MEDIA STREAMING

(71) Applicant: Sandisk Technologies, Inc., Milpitas, CA (US)

(72) Inventors: Rakesh Balakrishnan, Bangalore (IN); Govind Mangal, Bangalore (IN); Eldhose Peter, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/182,033

(22) Filed: Feb. 22, 2021

(65) Prior Publication Data

US 2022/0206711 A1 Jun. 30, 2022

Related U.S. Application Data

(60) Provisional application No. 63/130,676, filed on Dec. 26, 2020.

(51) Int. Cl.
*G06F 3/06* (2006.01)
*G06F 12/1009* (2016.01)
*G10L 19/16* (2013.01)
*H04L 65/70* (2022.01)

(52) U.S. Cl.
CPC .......... *G06F 3/0659* (2013.01); *G06F 3/0604* (2013.01); *G06F 3/0679* (2013.01); *G06F 12/1009* (2013.01); *G10L 19/167* (2013.01); *H04L 65/70* (2022.05); *G06F 2212/657* (2013.01)

(58) Field of Classification Search
CPC .... G06F 3/0659; G06F 3/0604; G06F 3/0679; G06F 12/1009; G06F 2212/657; G10L 19/167; H04L 65/607
USPC ...................................................... 711/103
See application file for complete search history.

(56) References Cited

U.S. PATENT DOCUMENTS 5,691,972 A * 11/1997 Tsuga ................ G11B 27/34
369/30.04
6,088,507 A * 7/2000 Yamauchi ............ H04N 9/8045
386/246
6,453,115 B1 9/2002 Boyle
(Continued)

FOREIGN PATENT DOCUMENTS

WO 2009062443 5/2009

*Primary Examiner* — Gautam Sain
(74) *Attorney, Agent, or Firm* — Chang & Hale LLP

(57) ABSTRACT

Systems and methods are disclosed for providing multilingual media files. In certain embodiments, a data storage device includes a controller configured to: receive a command to write data for a media file to a non-volatile memory, wherein the media file includes one or more frames each including a video frame and a plurality of audio frames associated with a plurality of languages; decode using a decoder a first frame of the media file to determine a logical block address (LBA) for a video frame of the first frame and an LBA for each of a plurality of audio frames of the first frame; write the first frame to the non-volatile memory; and update a logical-to-physical (L2P) table to add information associated with the LBA for the video frame of the first frame and the LBA for each of the plurality of audio frames of the first frame.

20 Claims, 10 Drawing Sheets

(56) References Cited

U.S. PATENT DOCUMENTS

| | | | | |
|---|---|---|---|---|
| 6,775,466 B1* | 8/2004 | Koshino | ........... | H04L 12/40117 |
| | | | | 711/170 |
| 9,554,110 B1* | 1/2017 | Ahsan | ...................... | H04N 9/79 |
| 10,832,692 B1* | 11/2020 | Diaz | ....................... | G10L 25/54 |
| 2012/0102297 A1* | 4/2012 | Haines | .................. | G06F 3/0613 |
| | | | | 711/E12.078 |
| 2013/0268970 A1 | 10/2013 | Ellis et al. | | |
| 2019/0243754 A1* | 8/2019 | Yu | .......................... | G06F 12/122 |
| 2020/0110536 A1* | 4/2020 | Navon | ................... | G06N 5/046 |

* cited by examiner

DEVICES AND METHODS FOR OPTIMIZED FETCHING OF MULTILINGUAL CONTENT IN MEDIA STREAMING

CROSS-REFERENCE TO RELATED APPLICATION(S)

This application claims the benefit of U.S. Provisional Patent Application No. 63/130,676, filed Dec. 26, 2020, entitled "DEVICES AND METHODS FOR OPTIMIZED FETCHING OF MULTILINGUAL CONTENT IN MEDIA STREAMING," which is hereby expressly incorporated by reference herein in its entirety for all purposes.

BACKGROUND

Field

The present disclosure relates to data storage systems. In particular, the present disclosure relates to providing multilingual media data stored in data storage systems.

Description of Related Art

Users may access data, such as files, in various types of data storage systems/architectures. As an example, users may request media files from media servers, which in turn may access requested media files from storage systems in order to provide to users. Media files requested by users can be played back by media players on user devices. Media files may include video data and audio data. Audio data may be available in multiple languages.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
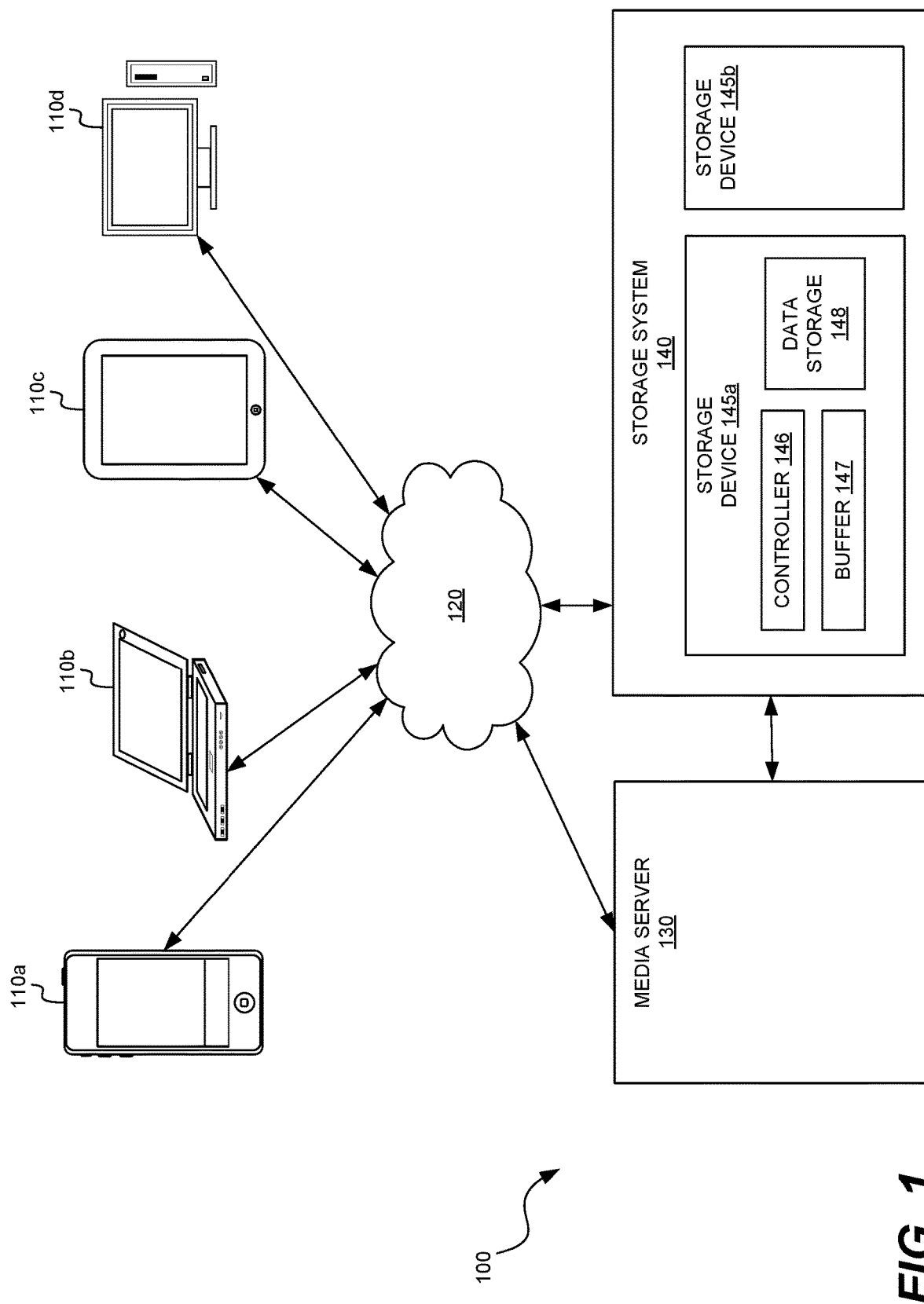
FIG. 1 illustrates an example system architecture for an example storage system relating to providing multilingual media data, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Systems for Providing Multilingual Media Data

Users may request or access different types of data from storage systems, for example, using one or more applications. In some cases, data can be media data, and a user may request playback of a media file from a media server. For instance, the user may access the media file using a media player on a user device. The media server in turn may access and provide the requested media file from a storage system. The requested media file transmitted to the user device can be played back using the media player. The media file can include video data and audio data, and audio data may be available in multiple languages. Audio data can be played back in a language that is selected by the user.

For a video frame, a media file may include a corresponding audio frame in each language that is available for playback. For example, if Language 1 and Language 2 are available for playback, each video frame has a corresponding audio frame in Language 1 and a corresponding audio frame in Language 2. When multiple languages are available for playback, the media server and/or the storage system generally send audio frames for all available languages to the user device, and audio frames for languages that are not selected for playback are discarded by the media player. Only audio frames for the selected language are played back by the media player. Accordingly, audio data that is not needed by the user device may be transmitted from the media server and/or the storage system, consuming bandwidth and affecting performance.

In order to address these and other challenges, a storage system according to certain aspects can provide audio data in a selected language when providing a media file for playback. The storage system can include a decoder or decoding functionality to decode a media file. When writing a media file to data storage, the storage system can use the decoder to extract information relating to logical block addresses (LBAs) of video frames and LBAs of audio frames in different languages. The LBAs of the video frames and audio frames in various languages and corresponding physical addresses can be added to a logical-to-physical (L2P) table. When a user device and/or a media server requests the media file for playback, the storage system can access the L2P table to determine LBAs for video frames as well as LBAs for audio frames in the selected language for playback. The video frames and the audio frames for the selected language can be loaded into a buffer, and transmitted to the media server and the user device. The media player on the user device can play back the received frames without having to discard audio frames that are not in the selected language. By only sending audio frames in the selected language, an amount of bandwidth and memory used can be reduced, and performance can be increased. Details relating to the storage system for providing multilingual media data are provided below.

FIG. 1 illustrates an example system architecture 100 for an example storage system 140 relating to providing multilingual media data, in accordance with one or more embodiments. The architecture 100 can include one or more user or client computing devices 110, which may be coupled to one or more media servers 130 via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

The architecture 100 can also include the storage system 140 for providing multilingual media data. The media server 130 may be coupled to the storage system 140 directly or via the network 120. The storage system 140 can include one or more storage devices 145. A storage device 145a can include a controller 146, a buffer 147, and data storage 148 (e.g., non-volatile memory). A storage device 145b can also include similar components. The storage system 140 may store data and/or data objects that may be accessed by the media server 130 and the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

A user can access and play a media file on a client computing device 110 using a media player. For example, the client computing device 110 can send a request to a media server 130 for playback of the media file, and the media server 130 can retrieve the media file from the storage system 140. The media file can be provided to the client computing device 110, for example, for streaming. In some cases, the media server 130 and the client computing device 110 may be a part of or implemented on the same computing device. In some embodiments, a "host" can refer to a system or device from which media data on a storage system or device is accessed or requested. For instance, the client computing device 110 or the media server 130 can be a host, depending on the embodiment. In some embodiments, a "device" can refer to a storage system or device from which media data is obtained, for example, to provide to a host.

According to certain embodiments, the storage system 140 can be configured to provide audio data in a selected language for playback of media files, as described herein. For example, a controller 146 of a storage device 145 can include decoding functionality, and when a media file is written to the storage device 145, the controller 146 can decode the media file in order to extract audio information associated with audio frames for different languages. The controller 146 may also extract video information associated with video frames. The controller 146 can add LBAs for video frames as well as LBAs for audio frames in each language to an L2P table. For instance, the L2P table can be a lookup table that includes information for mapping or converting LBAs to physical addresses in data storage 148. When the storage system 140 receives a request for playback of the media file in a selected language, the controller 146 can access the L2P table to determine LBAs for video frames and audio frames in the selected language and corresponding physical addresses. Then, the controller 146 can retrieve the video frames and the audio frames in the selected language into the buffer 147 from the data storage 148. Additional details relating to providing audio data in selected languages are described further below, for example, in connection with FIGS. 5-9.

Figure 2:
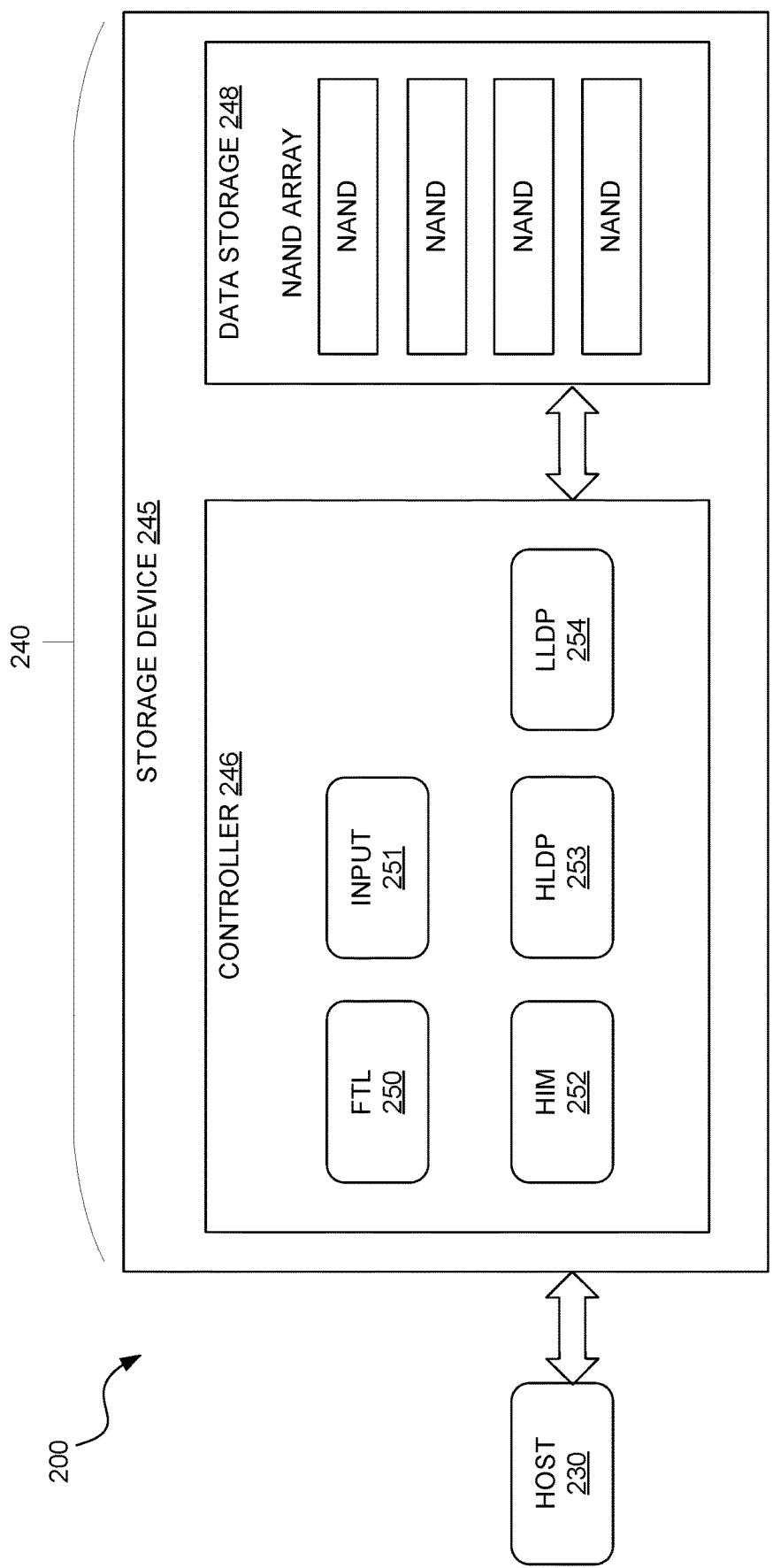
FIG. 2 is a block diagram illustrating an example storage system, in accordance with one or more embodiments.

FIG. 2 is a block diagram 200 illustrating an example storage system 240, in accordance with one or more embodiments. In some embodiments, components of FIG. 2 can be similar to components of FIG. 1 having similar names and/or reference numbers. The storage system 240 can include one or more storage devices 245. The storage device 245 can communicate with a host 230, such as a media server. The storage device 245 can include a controller 246 and data storage 248. As shown in FIG. 2, the storage device 245 is an SSD device and includes a NAND array. The controller 246 can include various components. In some embodiments, the controller 246 includes a flash translation layer (FTL) 250, an input 251, a host interface manager (HIM) 252, a high-level data processor (HLDP) 253, and a low-level data processer (LLDP) 254. For instance, the FTL 250 may handle translation of LBAs from the host 230 to physical addresses on the data storage 248 as well as garbage collection. The HLDP 253 and LLDP 254 may be layers below the FTL 250, for example, for processing commands and/or managing NAND. The controller 246 may include additional or fewer components, depending on the embodiment. In the example of FIG. 2, the controller 246 does not include a video decoder or decoding functionality, and accordingly, the controller 246 may not be configured to extract further information from a media file by decoding the media file.

Figure 3:
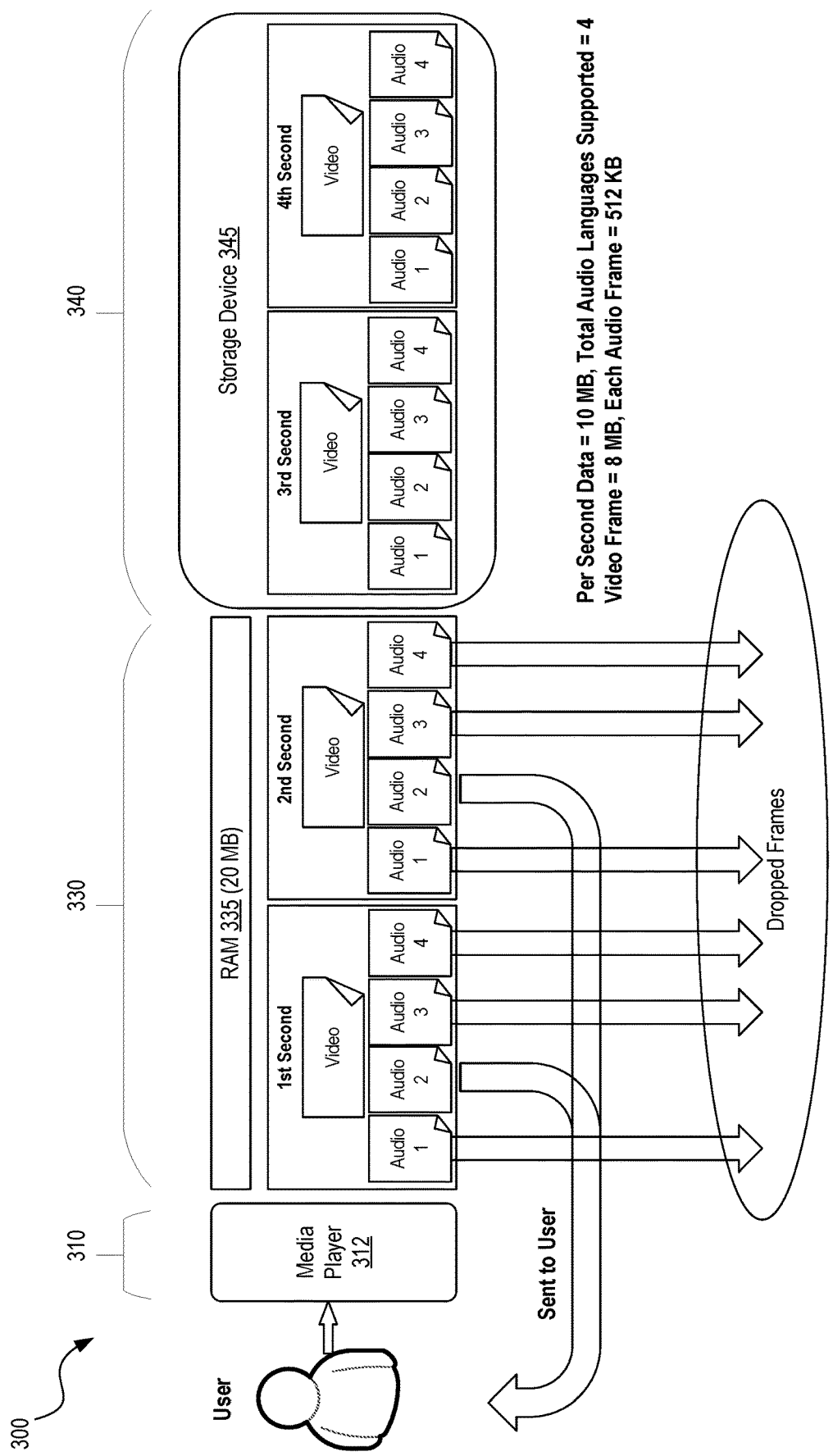
FIG. 3 is a block diagram illustrating playback of a multilingual media file, in accordance with one or more embodiments.

FIG. 3 is a block diagram 300 illustrating playback of a multilingual media file, in accordance with one or more embodiments. In certain embodiments, a multilingual media file can refer to a media file that provides audio data in multiple languages. The media file may be provided by a storage system 340, which can be similar to a storage system 240 in FIG. 2. In some embodiments, components of FIG. 3 can be similar to components of FIG. 2 having similar names and/or reference numbers. Certain details relating to the block diagram 300 are described above in connection with FIG. 2.

A user can request playback of a media file to a media server 330 via a media player 312 on a client computing device 310. For instance, the media file can be stored on a storage device 345. A media file can include one or more frames, and each frame can include video data and audio data. In the example of FIG. 3, the media file includes audio data in 4 different languages, and the playback language is selected as Language 2. In this example, a frame of the media file corresponds to one second and includes 1 video frame and 4 audio frames, one audio frame for each language. The media data for a frame can be included in a container. Examples of containers can include MPEG-4 Part 14 (MP4), Audio Video Interleave (AVI), etc. For instance, the video frame and 4 audio frames for each frame of the media file can be included in an MP4 container. In the example of FIG. 3, the media data for a frame for one second is 10 megabytes (MB), where the video frame is 8 MB and each audio frame is 512 kilobytes (KB). The media server 330 can include a RAM 335 for storing media data to transmit to one or more client computing devices 310. In the example of FIG. 3, the size of the RAM 335 is 20 MB. Accordingly, the RAM 335 can store media data for 2 frames corresponding to 2 seconds. Values for number of languages, video frame size, audio frame size, RAM size, etc. are provided for illustrative purposes only, and any values may be used as appropriate.

The media server 330 can request the media file from the storage device 345, and the storage device 345 can transmit the video frame and 4 audio frames for each second to the media server 330. As shown in FIG. 3, the RAM 335 includes media data for the frames for the first second and the second, where the media data for each frame includes 1 video and 4 audio frames. The storage device 345 loads media data for the third second and the fourth second into its buffer, such as a transfer RAM (TRAM). The media server 330 sends the video frames and the audio frames in the RAM 335 to the client computing device 310. Since Language 2 is selected for playback, the media player 312 on the client computing device 310 drops audio frames in languages other than Language 2 and plays back audio frames in Language 2. Audio frames for the non-selected languages are discarded at the application layer level. Therefore, the storage device 345 sends audio frames that are not used by the client computing device 310 to the media server 330, taking up bandwidth and memory in the RAM 335. In addition, the media server 330 also sends audio frames that are not used to the client computing device 310, taking up bandwidth and resources.

Figure 4:
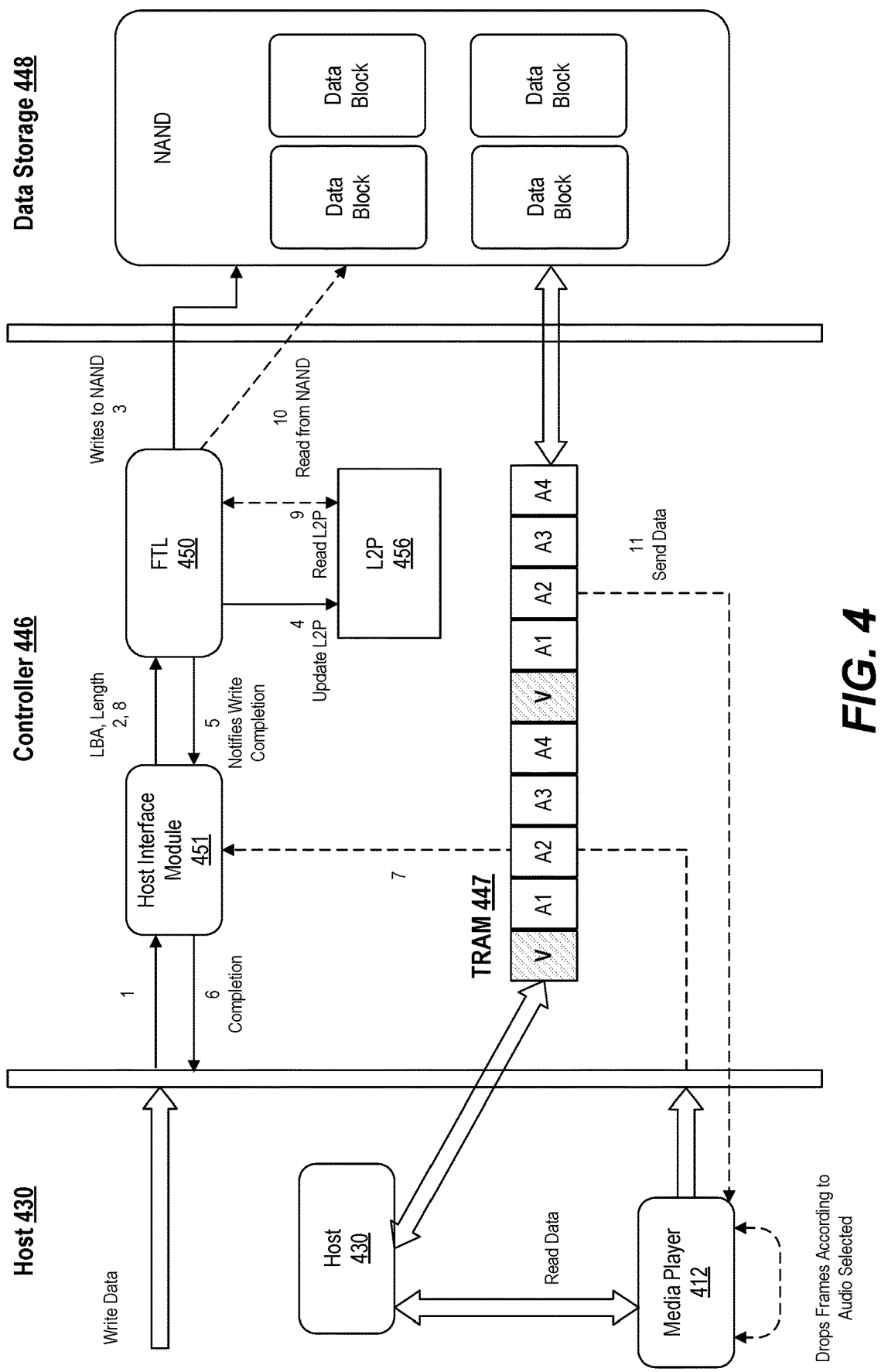
FIG. 4 is a data flow diagram illustrating writing and reading of a multilingual media file, in accordance with one or more embodiments.

FIG. 4 is a data flow diagram 400 illustrating writing and reading of a multilingual media file, in accordance with one or more embodiments. Writing and reading of the media file may be performed by a storage system, such as a storage system 240, 340 shown in FIGS. 2-3. In some embodiments, components of FIG. 4 can be similar to components of FIGS. 2-3 having similar names and/or reference numbers. The data flow diagram 400 illustrates writing and reading of media data between a host 430 (e.g., a media server) and a storage device, which includes a controller 446 and data storage 448. The controller 446 can include an FTL 450, an HIM 451, and an L2P table 456. Depending on the embodiment, the data flow diagram 400 may include fewer or additional blocks, and the blocks may be performed in an order that is different from illustrated.

Data flow blocks 1-6 relate to writing media data. At block 1, the host 430 sends a command to write media data to the HIM 451. At block 2, the HIM 451 forwards an LBA and a length for the media data to be written to the FTL 450. At block 3, the FTL 450 writes the media data to the data storage 448 (e.g., NAND array). In some cases, the media data may correspond to a frame, which includes a video frame and 4 audio frames. At block 4, the FTL 450 updates the L2P table 456 to add the LBA information and corresponding physical address information for the media data that has been written to the data storage 448. For example, the LBA for the start of the frame or the LBA range for the frame may be added to the L2P table 456. At block 5, the FTL 450 notifies the HIM 451 of write completion. At block 6, the HIM 451 notifies the host 430 of write completion.

In some embodiments, different types of data included for a frame within a container can be referred to as "components." For instance, the video frame and the audio frames may each be referred to as a component. Because the controller 446 does not include any decoding logic, the controller 446 may not be able to decode a media file or a structure of individual components within a frame, such as video frames and audio frames. Therefore, the controller 446 is unable to add any further information relating to video frames and audio frames into the L2P table 456, such as LBAs for video frames or LBAs for individual audio frames.

Data flow blocks 7-11 relate to reading media data. At block 7, a media player 412 on a client computing device sends a request for playback of a media file stored on the data storage 448 to the host 430, and the host 430 sends a read command to the HIM 451. At block 8, the HIM 451 forwards an LBA and a length for the media data to be read to the FTL 450. In some cases, the media data may correspond to a frame, which includes a video frame and 4 audio frames. At block 9, the FTL 450 reads the L2P table 456 to determine a physical address corresponding to the LBA. At block 10, the FTL 450 reads the requested media data from the data storage 448 and loads the read data into a buffer, such as a TRAM 447. As shown in FIG. 4, a video frame and 4 audio frames for each frame are loaded into the TRAM 447. Because the L2P table 456 does not include LBAs for audio frames in different languages, the controller 446 provides audio frames for all languages for a given frame. At block 11, the data in the TRAM 447 is sent to the host 430, which sends the data to the client computing device. The media player 412 plays the media file and drops audio files not in the selected language for playback. As described above, the storage device as well as the host 430 and the client computing device consume bandwidth and memory for sending and/or receiving audio data that is not played back to the user.

Figure 5:
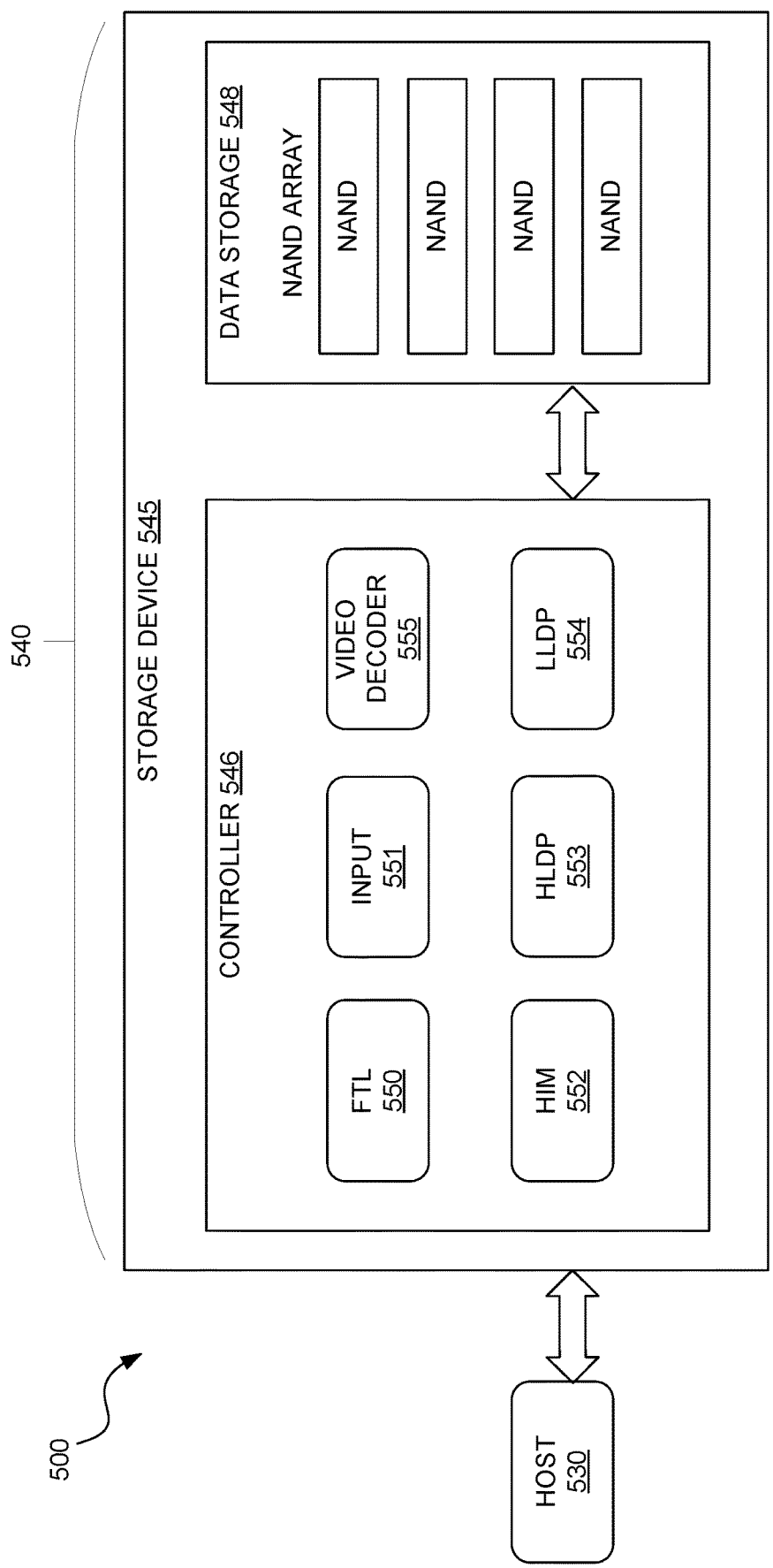
FIG. 5 illustrates a block diagram illustrating an example storage system, in accordance with one or more embodiments.

FIG. 5 illustrates a block diagram 500 illustrating an example storage system 540, in accordance with one or more embodiments. In some embodiments, components of FIG. 5 can be similar to components of FIG. 1 having similar names and/or reference numbers. Certain aspects relating to the block diagram 500 are described above in connection with FIGS. 1-4. The storage system 540 can be similar to a storage system 240 in FIG. 2, but the storage system 540 additionally includes decoding functionality for decoding media files. The storage system 540 can include one or more storage devices 545. The storage device 545 can communicate with a host 530, such as a media server. The storage device 545 can include a controller 546. The controller 546 can include various components, such as an FTL 550, an input 551, an HIM 552, an HLDP 553, and an LLDP 554. The controller 546 may include additional or fewer components, depending on the embodiment. The storage device 545 also includes data storage 548. As shown in FIG. 5, the storage device 545 is an SSD device and includes a NAND array.

In the example of FIG. 5, the controller 546 further includes decoding functionality. In some embodiments, the controller 546 includes a video decoder 555. In other embodiments, the controller 546 includes a general-purpose processor for running a decoding algorithm. Since the controller 546 has capability for decoding media files, the controller 546 can decode a media file and extract information relating to a structure of individual components within a frame of the media file. For instance, the controller 546 can determine LBAs of a video frame and audio frames for different languages within a frame of the media file.

Figure 6:
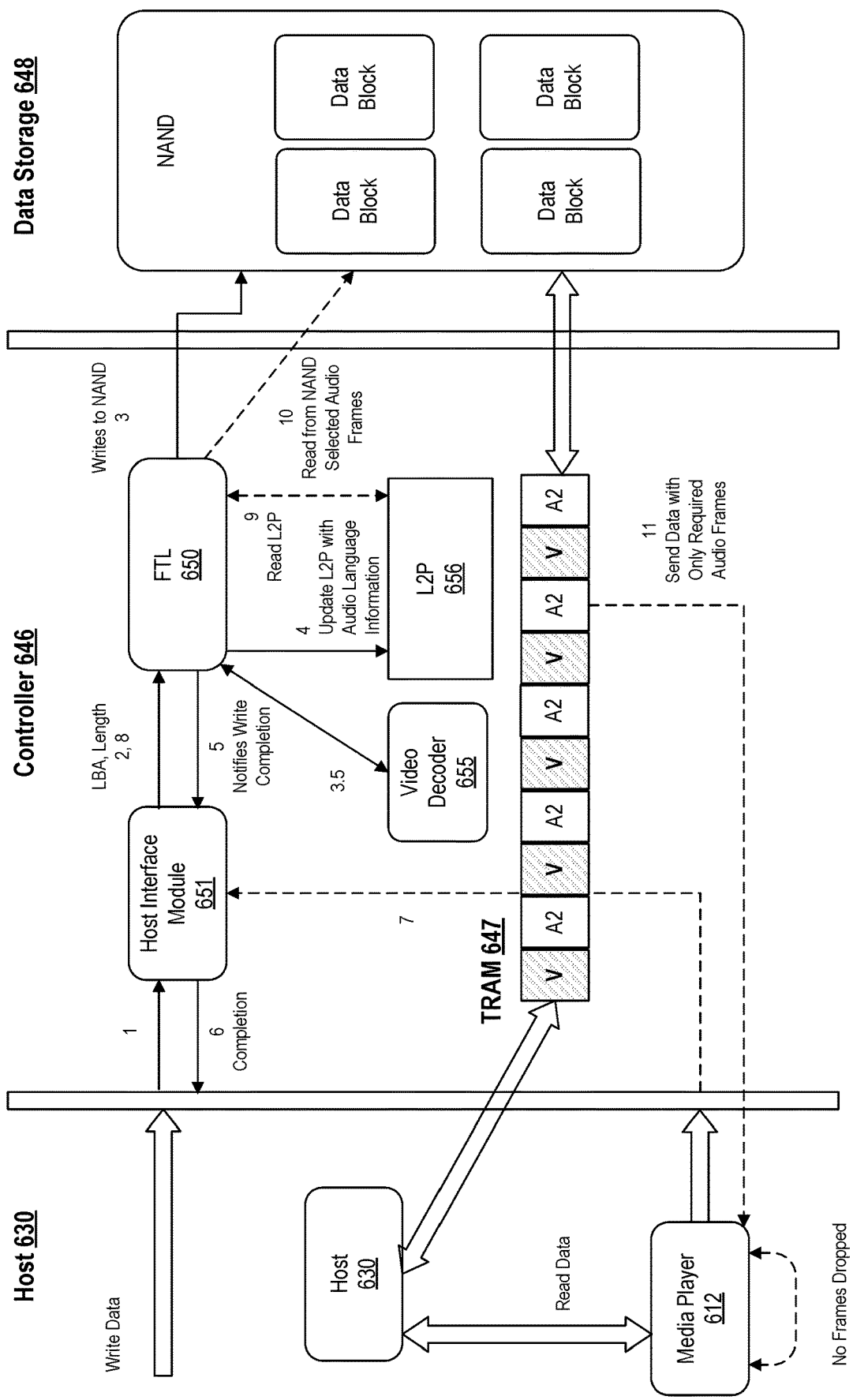
FIG. 6 illustrates a data flow diagram illustrating writing and reading of a multilingual media file, in accordance with one or more embodiments.

FIG. 6 illustrates a data flow diagram 600 illustrating writing and reading of a multilingual media file, in accordance with one or more embodiments. Writing and reading of the media file may be performed by a storage system, such as a storage system 540 shown in FIG. 5. In some embodiments, components of FIG. 6 can be similar to components of FIG. 5 having similar names and/or reference numbers. The data flow diagram 600 illustrates writing and reading of media data between a host 630 (e.g., a media server) and a storage device, which includes a controller 646 and data storage 648. The controller 646 can include an FTL 650, an HIM 651, a video decoder 655, and an L2P table 656. Depending on the embodiment, the data flow diagram 600 may include fewer or additional blocks, and the blocks may be performed in an order that is different from illustrated.

Data flow blocks 1-6 relate to writing media data. At block 1, the host 630 sends a command to write media data to the HIM 651. At block 2, the HIM 651 sends an LBA and a length for the media data to be written to the FTL 650. At block 3, the FTL 650 writes the media data to the data storage 648 (e.g., NAND array). For instance, the media data can be a frame, which includes a video frame and 4 audio frames. The controller 646 includes decoding functionality and is able to decode a structure of individual components within the frame. For instance, media data for the frame is included within a container. At block 3.5, the video decoder 655 can be used to decode individual components within the frame and extract detailed information relating to the individual components. For example, respective LBAs for the start of the video frame and the start of each of the 4 audio frames can be determined. Supposing the length of the frame is from LBA X to LBA Y, the decoder 655 can determine that the video frame starts at LBA X, the first audio frame starts at LBA $X_1$, the second audio frame starts at LBA $X_2$, the third audio frame starts at LBA $X_3$, and the fourth audio frame starts at LBA $X_4$.

At block 4, the FTL 650 updates the L2P table 656 to add the LBA information and physical address information corresponding to the LBA information for the media data that has been written to the data storage 648. With the information extracted with the decoder 655, the FTL 650 adds the respective LBAs for the video frame and the 4 audio frames to the L2P table 656, which can be used when reading the media file to provide audio frames in a selected language. In some cases, an LBA range for each component can be added to the L2P table 656. As an example, the L2P table 656 can include mapping information as follows:

| | | |
|---|---|---|
| $X$-$X_1$ | Video | Physical Address a-$a_1$ |
| $X_1$-$X_2$ | Audio 1 | Physical Address $a_1$-$a_2$ |
| $X_2$-$X_3$ | Audio 2 | Physical Address $a_2$-$a_3$ |
| $X_3$-$X_4$ | Audio 3 | Physical Address $a_3$-$a_4$ |
| $X_4$-$Y$ | Audio 4 | Physical Address $a_4$-b |

In certain embodiments, the decoder 655 can provide information relating to other components of the frame, such as subtitles, etc., which may also be added to the L2P table 656 to facilitate accessing such components. At block 5, the FTL 650 notifies the HIM 651 of write completion. At block 6, the HIM 651 notifies the host 630 of write completion.

Data flow blocks 7-11 relate to reading media data. At block 7, a media player 612 on a client computing device sends a request for playback of a media file stored on the data storage 648 to the host 630, and the host 630 sends a read command to the HIM 651. The media player 612 and the host 630 can communicate to the controller 646 which language is selected for playback of the media file. At block 8, the HIM 651 forwards an LBA and a length for the media data to be read to the FTL 650. For instance, the media data can be a frame, which includes a video frame and 4 audio frames. At block 9, the FTL 650 reads the L2P table 656 to determine the LBA for the video frame and the LBA for the audio frame in the selected language. At block 10, the FTL 650 reads the requested media data from the data storage 648 and loads the read data into a buffer, such as a TRAM 647. As shown in FIG. 6, for each frame, a video frame and an audio frame in the selected language are loaded into the TRAM 647. At block 11, the video frames and the audio frames in the TRAM 647 are sent to the host 630, which sends the video frames and the audio frames to the client computing device. Since the controller 646 only sends audio frames in the selected language, the media player 612 plays back the received video frames and audio frames without having to drop any audio frames.

In some cases, the selected language for playback may be changed by the user. In such cases, the host 630 receives the updated selected language for playback from the client computing device and communicates the updated selected language to the controller 646. Then, the controller 646 can begin sending an audio frame for the updated selected language along with the video frame for each frame. In certain embodiments, a protocol can be defined for communicating the selected playback language between the host 630 and the storage device as well as any other information used to support providing audio data in the selected playback language.

Figure 7:
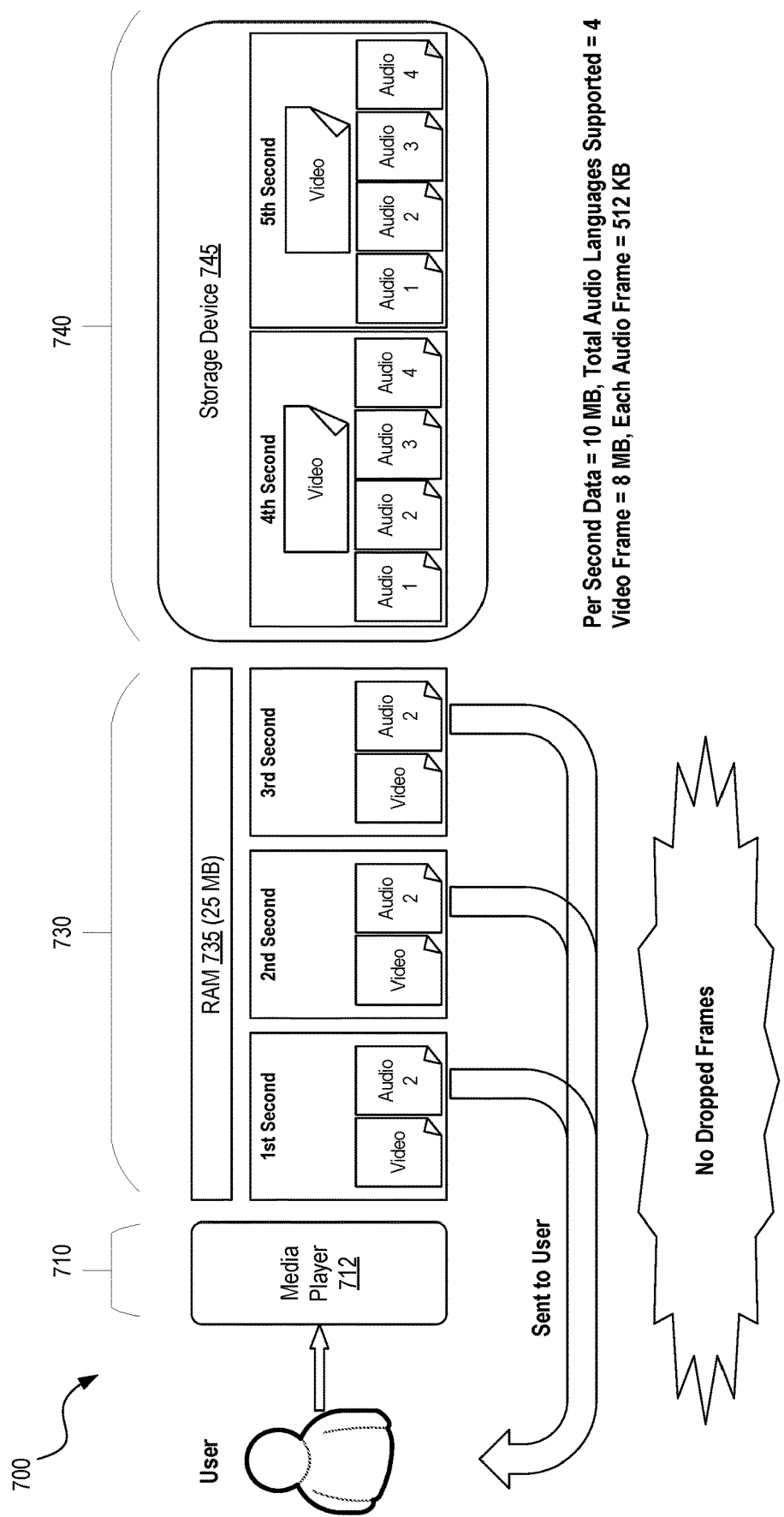
FIG. 7 illustrates a block diagram illustrating playback of a multilingual media file, in accordance with one or more embodiments.

FIG. 7 illustrates a block diagram 700 illustrating playback of a multilingual media file, in accordance with one or more embodiments. The media file may be provided by a storage system 740, which can be similar to a storage system 540 in FIG. 5. In some embodiments, components of FIG. 7 can be similar to components of FIGS. 5-6 having similar names and/or reference numbers. Certain details relating to the block diagram 700 are described above in connection with FIGS. 5-6.

As in the example of FIG. 3, a user can request playback of a media file to a media server 730 via a media player 712 on a client computing device 710. The media file can be stored on a storage device 745. In the example of FIG. 7, the media file includes audio data in 4 different languages, and the playback language is selected as Language 2. In this example, a frame of the media file corresponds to one second and includes 1 video frame and 4 audio frames, one audio frame for each language. The media data for a frame can be included in a container. Examples of containers can include MP4, AVI, etc. For instance, the video frame and 4 audio frames for each frame of the media file can be included in an MP4 container. As in the example of FIG. 3, the media data for a frame for one second is 10 MB, where the video frame is 8 MB and each audio frame is 512 KB. The media server 730 can include a RAM 735 for storing media data to transmit to one or more client computing devices 710. In the example of FIG. 7, the size of the RAM 335 is 25 MB. Accordingly, the RAM 335 can store media data for 3 frames corresponding to 3 seconds. Values for number of languages, video frame size, audio frame size, RAM size, etc. are provided for illustrative purposes only, and any values may be used as appropriate.

The media server 730 can request the media file from the storage device 745. As indicated above, Language 2 is the selected language for playback, which can be communicated to the storage device 745 by the media server 730. In response to the request, the storage device 745 can transmit the video frame and an audio frame in the selected language for each second to the media server 730. By accessing LBA information for audio frames in an L2P table, the storage device 745 only sends audio frames in the selected language. As shown in FIG. 7, the RAM 735 includes media data for the frames for the first second, the second, and the third second, where the media data for each frame includes 1 video frame and 1 audio frame. The storage device 745 loads media data for the fourth second and the fifth second into its buffer, such as a TRAM. The media server 730 sends the video frames and the audio frames in the RAM 735 to the client computing device 710. Since Language 2 is selected for playback, the media player 712 on the client computing device 710 plays back audio frames in Language 2 without dropping any audio frames.

In this manner, a storage system for providing multilingual media data, such as a storage system 140, 540, 740 in FIGS. 1, 5, and 7, can send only audio frames in a selected language for playback when providing a multilingual media file. Thus, the storage system can reduce an amount of bandwidth and memory used to send the media file to a host as well as increase throughput. In turn, an amount of bandwidth and memory used to send the media file from the host to a client computing device can also be reduced. The RAM on the host may be used more effectively since less memory can be used to store media data for a frame, and throughput can be increased. The client computing device also does not need to receive or process as much data, resulting in increased performance. In this way, performance can be improved, and an amount of resources used to transmit the media file for playback between the storage device, the host, and the client computing device can be reduced, leading to better user experience.

In certain embodiments, the techniques as described herein may apply to other types of data in a media file where only a portion of the data is required by a host or a client computing device. For instance, the storage system can use decoding functionality to determine various components of a frame in a media file, update an L2P table with LBA information relating to one or more components, and send only required components for playback. As an example, if a media file includes stereo audio data and playback only requires one channel of audio data, the storage system can be configured to send audio data for only a single channel for each frame. As another example, if a media file includes 5.1 surround sound audio data and playback only requires 2.1 audio data, the storage system can be configured to send 2.1 audio data for each frame.

In some embodiments, the techniques as described herein can apply to data that is being stored in the storage system. The storage system can use decoded information relating to a media file to write only required data to the data storage. For example, when audio frames are available for multiple languages for a media file, the storage system can only write audio frames in a particular language to the data storage and drop audio frames in other languages. In some cases, if a user generally selects a particular language for playback, media files associated with the user can be stored with only audio frames in that particular language. All examples herein are provided for illustrative purposes, and there can be many variations and other possibilities.

Figure 8:
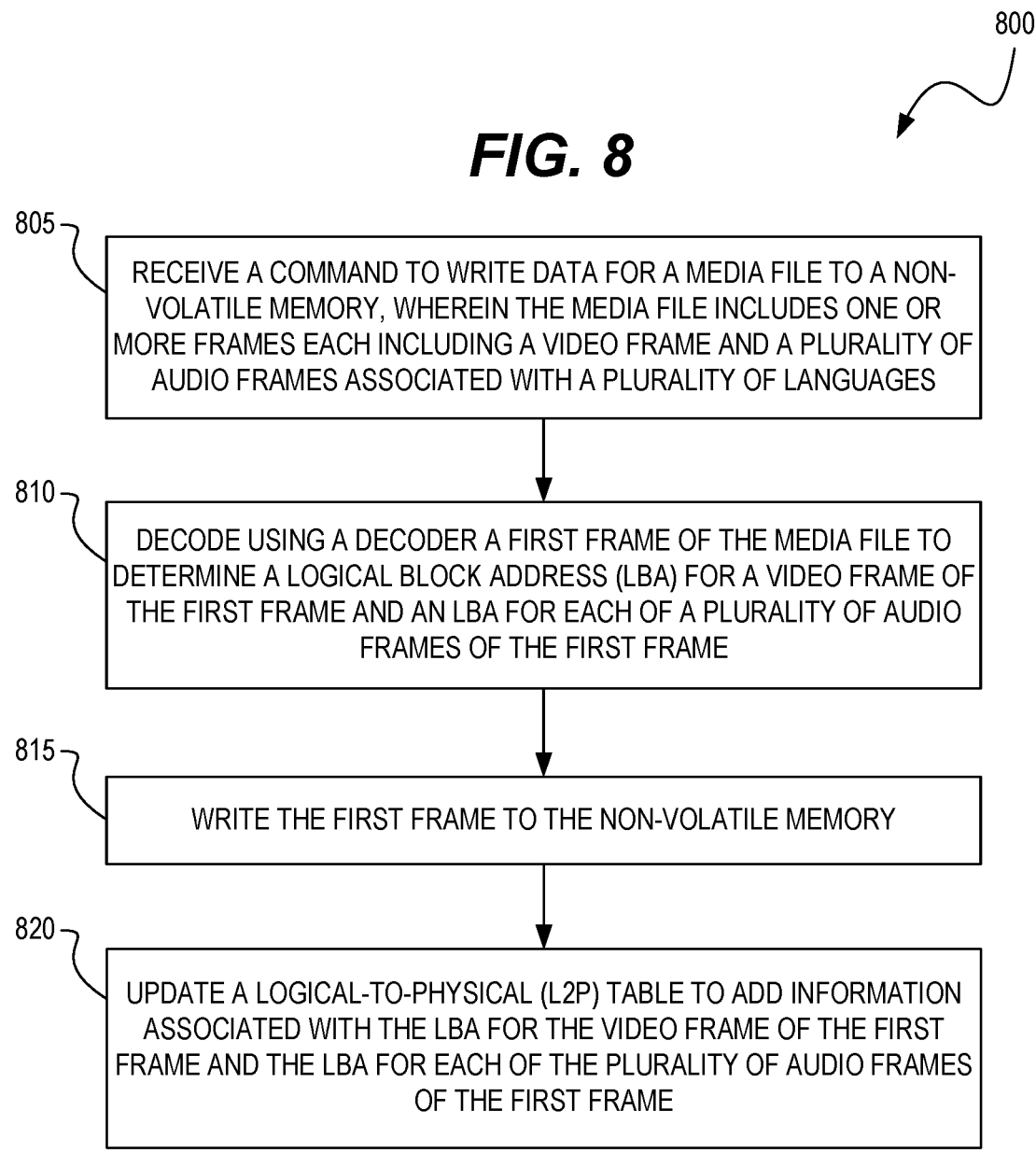
FIG. 8 illustrates a workflow process for providing multilingual media data, in accordance with one or more embodiments.

FIG. 8 illustrates a workflow process 800 for providing multilingual media data, in accordance with one or more embodiments. For example, the workflow process 800 may be performed by a controller of a storage system or a storage device, such as a storage system 140 or a storage device 145. For illustrative purposes, the process 800 is explained below in connection with the storage system 140. Certain details relating to the process 800 are explained in more detail with respect to FIGS. 1-7. Depending on the embodiment, the process 800 may include fewer or additional blocks, and the blocks may be performed in an order that is different from illustrated.

At block 805, the storage system 140 can receive a command to write data for a media file to a non-volatile memory, wherein the media file includes one or more frames each including a video frame and a plurality of audio frames associated with a plurality of languages. For example, the controller of the storage system 140 can include a decoder. The decoder can be configured to decode a structure of individual components within a frame of the media file. In some embodiments, a frame of the media file is included in a container. In some cases, the container includes MP4.

At block 810, the storage system 140 can decode, using the decoder, a first frame of the media file to determine an LBA for a video frame of the first frame and an LBA for each of a plurality of audio frames of the first frame. At block 815, the storage system 140 can write the first frame to the non-volatile memory.

At block 820, the storage system 140 can update an L2P table to add information associated with the LBA for the video frame of the first frame and the LBA for each of the plurality of audio frames of the first frame. In some embodiments, the controller includes an FTL configured to translate LBAs to physical addresses, and the FTL receives information relating to a decoded structure of individual components within the first frame of the media file and updates the L2P table with the information associated with the LBA for the video frame of the first frame and the LBA for each of the plurality of audio frames of the first frame.

In some embodiments, the L2P table includes a start LBA and a length of the video frame of the first frame, and a start LBA and a length of each of the plurality of audio frames of the first frame. In other embodiments, the L2P table includes an LBA range for the video frame of the first frame and an LBA range for each of the plurality of audio frames of the first frame. In certain embodiments, the updating the L2P table includes adding physical address information associated with the LBA for the video frame of the first frame and the LBA for each of the plurality of audio frames of the first frame.

Figure 9:
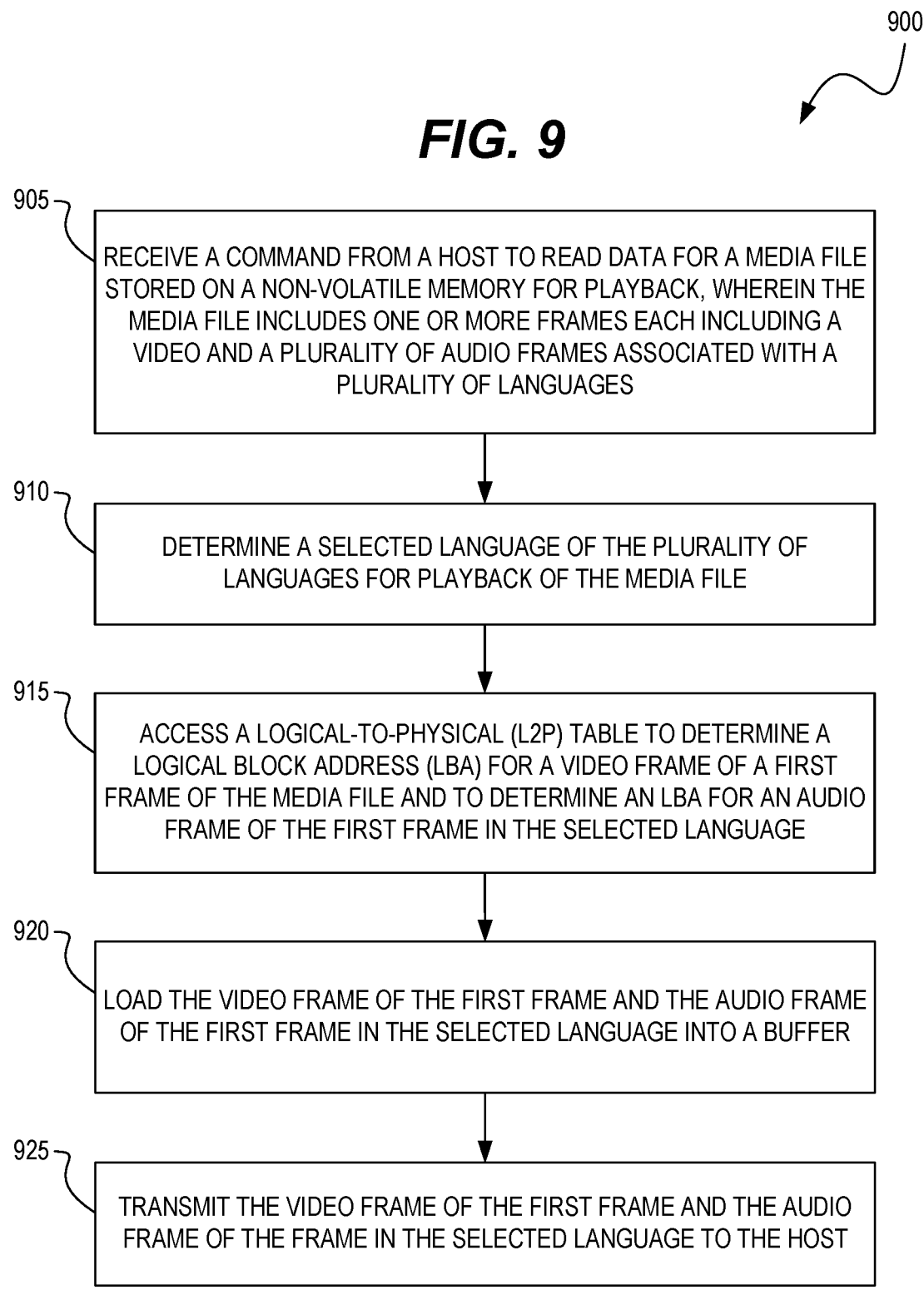
FIG. 9 illustrates a workflow process for providing multilingual media data, in accordance with one or more embodiments.

FIG. 9 illustrates a workflow process 900 for providing multilingual media data, in accordance with one or more embodiments. For example, the workflow process 900 may be performed by a controller of a storage system or a storage device, such as a storage system 140 or a storage device 145. For illustrative purposes, the process 900 is explained below in connection with the storage system 140. Certain details relating to the process 900 are explained in more detail with respect to FIGS. 1-8. Depending on the embodiment, the process 900 may include fewer or additional blocks, and the blocks may be performed in an order that is different from illustrated.

At block 905, the storage system 140 can receive a command from a host to read data for a media file stored on a non-volatile memory for playback, wherein the media file includes one or more frames each including a video and a plurality of audio frames associated with a plurality of languages. For example, the controller of the storage system 140 can include a decoder. The decoder can be configured to decode a structure of individual components within a frame of the media file. In some embodiments, a frame of the media file is included in a container. In some cases, the container includes MP4. At block 910, the storage system 140 can determine a selected language of the plurality of languages for playback of the media file.

At block 915, the storage system 140 can access an L2P table to determine an LBA for a video frame of a first frame of the media file and to determine an LBA for an audio frame of the first frame in the selected language. For example, the L2P table includes LBA information decoded from a frame of the media file using the decoder. In some embodiments, the L2P table includes a start LBA and a length of the video frame of the first frame, and a start LBA and a length of each of the plurality of audio frames of the first frame. In other embodiments, the L2P table includes an LBA range for the video frame of the first frame and an LBA range for each of the plurality of audio frames of the first frame. In certain embodiments, the L2P table includes physical address information associated with the LBA for the video frame of the first frame and the LBA for each of the plurality of audio frames of the first frame.

At block 920, the storage system 140 can load the video frame of the first frame and the audio frame of the first frame in the selected language into a buffer. At block 925, the storage system 140 can transmit the video frame of the first frame and the audio frame of the frame in the selected language to the host.

Figure 10:
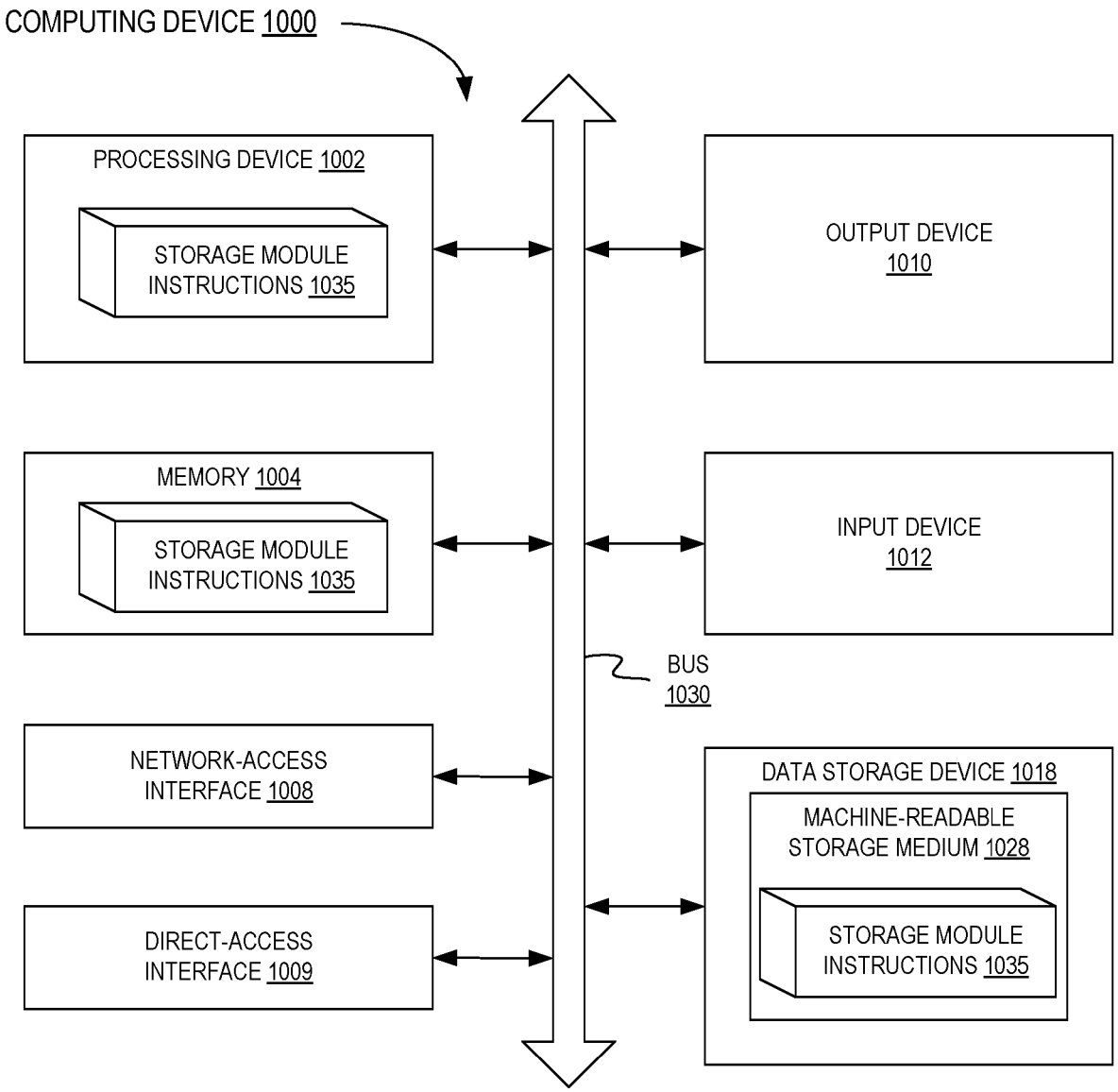
FIG. 10 is a diagram of a computing device, in accordance with one or more embodiments.

FIG. 10 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device (e.g., a processor, a controller, a central processing unit (CPU), etc.) 1002, a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. An external solid state data storage device comprising:
a non-volatile memory including NAND memory; and
one or more processors, individually or in combination, configured to:
receive a command from a host over a network to write data for a media file to the NAND memory, wherein the media file includes one or more frames, and each frame of the one or more frames includes a video frame and a plurality of audio frames associated with a plurality of languages;
decode the data for the media file to extract a first frame of the media file and determine a starting logical block address (LBA) for a video frame of the first frame and a starting LBA for each audio frame of a plurality of audio frames of the first frame;
write the first frame to the NAND memory; and
update a logical-to-physical (L2P) table in the external solid state data storage device, wherein the L2P table is configured to map LBAs and corresponding physical addresses in the NAND memory, to add the starting LBA and one or more corresponding physical addresses in the NAND memory for the video frame of the first frame and to add the starting LBA and one or more corresponding physical addresses in the NAND memory for each audio frame of the plurality of audio frames of the first frame, wherein the L2P table is further configured to enable the one or more processors, individually or in combination, upon request from the host for playback of the media file in a selected language, to access only the video frame of the first frame and an audio frame of the first frame in the selected language, out of the plurality of audio frames of the first frame, for loading into a buffer for transmission to the host, wherein the L2P table is further configured to enable the one or more processors, individually or in combination, to obtain data at frame level to extract individual components within a particular frame of the media file based on starting LBAs and corresponding physical addresses in the NAND memory for the individual components such that only an individual component within the frame can be obtained from the NAND memory and loaded into the buffer for transmission without obtaining data for the entire frame from the NAND memory, wherein the individual components of the frame include a video frame and an audio frame in the selected language, and wherein the one or more processors, individually or in combination, are configured to logically store the media file as a single file.

2. The external solid state data storage device of claim 1, wherein a frame of the media file is included in a container.

3. The external solid state data storage device of claim 2, wherein the container includes MPEG-4 Part 14 (MP4).

4. The external solid state data storage device of claim 1, wherein the one or more processors, individually or in combination, are further configured to decode a structure of individual components within a frame of the media file.

5. The external solid state data storage device of claim 4, wherein:
the one or more processors include a flash translation layer (FTL) configured to translate LBAs to physical addresses; and
the FTL is configured to receive information relating to a decoded structure of individual components within the first frame of the media file and update the L2P table with the starting LBA for the video frame of the first frame and the starting LBA for each of the plurality of audio frames of the first frame.

6. The external solid state data storage device of claim 1, wherein the L2P table is configured to include the starting LBA and a length of the video frame of the first frame, and the starting LBA and a length of each of the plurality of audio frames of the first frame.

7. The external solid state data storage device of claim 1, wherein the L2P table is configured to include an LBA range for the video frame of the first frame and an LBA range for each of the plurality of audio frames of the first frame.

8. The external solid state data storage device of claim 1, wherein the one or more processors, individually or in combination, are further configured to:
receive a command from a second host over the network to write data for a second media file to the NAND memory, wherein the second media file includes one or more frames, and each frame of the one or more frames includes a video frame and a plurality of audio frames associated with a plurality of languages;
determine a playback language associated with a user associated with the second media file;
decode the data for the second media file to extract a second frame of the second media file and determine a starting LBA for a video frame of the second frame and a starting LBA for an audio frame of the second frame in the playback language out of a plurality of audio frames of the second frame;
write the video frame of the second frame and only the audio frame of the second frame in the playback language to the NAND memory without writing other audio frames of the second frame not in the playback language; and
update the L2P table to add the starting LBA for the video frame of the second frame and the audio frame of the second frame in the playback language without adding starting LBAs for the other audio frames of the second frame not in the playback language.

9. An external solid state data storage device comprising:
a non-volatile memory including NAND memory; and
one or more processors, individually or in combination, configured to:
receive a command from a host over a network to read data for a media file from the NAND memory for playback, wherein the media file includes one or more frames, and each frame of the one or more frames includes a video frame and a plurality of audio frames associated with a plurality of languages;
determine a selected language of the plurality of languages for playback of the media file;
access a logical-to-physical (L2P) table in the external solid state data storage device that is configured to map logical block addresses (LBAs) and corresponding physical addresses in the NAND memory, wherein the L2P table is configured to include, for each frame of the media file, a starting LBA and one or more corresponding physical addresses in the NAND memory for a video frame of the frame and a starting LBA and one or more corresponding physical addresses in the NAND memory for each audio frame of a plurality of audio frames of the frame, and the one or more processors, individually or in combination, are configured to decode and provide the starting LBAs for the video frame and each audio frame, wherein the L2P table is further configured to enable the one or more processors, individually or in combination, to access, for a first frame of the media file, only the video frame of the first frame and an audio frame of the first frame in the selected language, out of the plurality of audio frames of the first frame, for loading into a buffer for transmission to the host, wherein the L2P table is further configured to enable the one or more processors, individually or in combination, to obtain data at frame level to extract individual components within a particular frame of the media file based on starting LBAs and corresponding physical addresses in the NAND memory for the individual components such that only an individual component within the frame can be obtained from the NAND memory and loaded into the buffer for transmission without obtaining data for the entire frame from the NAND memory, wherein the individual components of the frame include a video frame and an audio frame in the selected language, and wherein the one or more processors, individually or in combination, are configured to logically store the media file as a single file;
determine a starting LBA and one or more corresponding physical addresses in the NAND memory for the video frame of the first frame of the media file and determine a starting LBA and one or more corresponding physical addresses in the NAND memory for the audio frame of the first frame in the selected language based on the L2P table;
load the video frame of the first frame and the audio frame of the first frame in the selected language into the buffer; and
transmit the video frame of the first frame and the audio frame of the first frame in the selected language to the host.

10. The external solid state data storage device of claim 9, wherein a frame of the media file is included in a container.

11. The external solid state data storage device of claim 10, wherein the container includes MPEG-4 Part 14 (MP4).

12. The external solid state data storage device of claim 9, wherein the one or more processors, individually or in combination, are further configured to decode a structure of individual components within a frame of the media file.

13. The external solid state data storage device of claim 9, wherein the L2P table is configured to include LBA information decoded from a frame of the media file using the one or more processors.

14. The external solid state data storage device of claim 9, wherein the L2P table is configured to include the starting LBA and a length of the video frame of the first frame, and the starting LBA and a length of each of the plurality of audio frames of the first frame.

15. The external solid state data storage device of claim 9, wherein the L2P table is configured to include an LBA range for the video frame of the first frame and an LBA range for each of the plurality of audio frames of the first frame.

16. The external solid state data storage device of claim 9, wherein the one or more processors, individually or in combination, are further configured to:
receive a command from a second host over the network to read data for a second media file from the NAND memory for playback, wherein the second media file includes one or more frames, and each frame of the one or more frames is associated with a video frame and a plurality of audio frames associated with a plurality of languages;
determine a playback language associated with a user associated with the second media file, wherein, for each frame of the second media file, the video frame and only an audio frame in the playback language are configured to be stored in the NAND memory;
access the L2P table to determine, for a second frame of the second media file, a starting LBA and one or more corresponding physical addresses for a video frame of the second frame and an audio frame of the second frame in the playback language, wherein the L2P table is configured to include, for each frame of the second media file, a starting LBA and one or more corresponding physical addresses in the NAND memory for a video frame of the frame and a starting LBA and one or more corresponding physical addresses in the NAND memory for an audio frame of the frame in the playback language without including starting LBAs for other audio frames of the frame not in the playback language, and wherein the one or more processors, individually or in combination, are configured to decode and provide the starting LBAs for the video frame of the frame and the audio frame of the frame in the playback language;
load the video frame of the second frame and the audio frame of the second frame in the playback language into the buffer; and
transmit the video frame of the second frame and the audio frame of the second frame in the playback language to the second host.

17. An external solid state data storage system comprising:
a non-volatile memory including NAND memory; and
a controller means configured to:
decode media files using a decoder in the external solid state data storage system;
receive a command from a host over a network to write data for a media file to the NAND memory, wherein the media file includes one or more frames, and each frame of the one or more frames includes a video frame and a plurality of audio frames associated with a plurality of languages;
decode, using the decoder in the external solid state data storage system, the data for the media file to extract a first frame of the media file and determine a starting logical block address (LBA) for a video frame of the first frame and a starting LBA for each audio frame of a plurality of audio frames of the first frame;
write the first frame to the NAND memory; and
update a logical-to-physical (L2P) table in the external solid state data storage system, wherein the L2P table is configured to map LBAs and corresponding physical addresses in the NAND memory, to add the starting LBA and one or more corresponding physical addresses in the NAND memory for the video frame of the first frame and to add the starting LBA and one or more corresponding physical addresses in the NAND memory for each audio frame of the plurality of audio frames of the first frame, wherein the controller means is further configured to, upon request from the host for playback of the media file in a selected language, access only the video frame of the first frame and an audio frame of the first frame in the selected language, out of the plurality of audio frames of the first frame, based on the L2P table for loading into a buffer for transmission to the host, wherein the controller means is further configured to obtain data at frame level based on the L2P table to extract individual components within a particular frame of the media file based on starting LBAs and corresponding physical addresses in the NAND memory for the individual components such that only an individual component within the frame can be obtained from the NAND memory and loaded into the buffer for transmission without obtaining data for the entire frame from the NAND memory, wherein the individual components of the frame include a video frame and an audio frame in the selected language, and wherein the controller means is further configured to logically store the media file as a single file.

18. The external solid state data storage system of claim 17, wherein the decoder is configured to decode a structure of individual components within a frame of the media file.

19. The external solid state data storage system of claim 17, wherein the L2P table is configured to include the starting LBA and a length of the video frame of the first frame, and the starting LBA and a length of each of the plurality of audio frames of the first frame.

20. The external solid state data storage system of claim 17, wherein the controller means is further configured to:
receive a command from a second host over the network to write data for a second media file to the NAND memory, wherein the second media file includes one or more frames, and each frame of the one or more frames includes a video frame and a plurality of audio frames associated with a plurality of languages;
determine a playback language associated with a user associated with the second media file;
decode the data for the second media file to extract a second frame of the second media file and determine a starting LBA for a video frame of the second frame and a starting LBA for an audio frame of the second frame in the playback language out of a plurality of audio frames of the second frame;
write the video frame of the second frame and only the audio frame of the second frame in the playback language to the NAND memory without writing other audio frames of the second frame not in the playback language; and
update the L2P table to add the starting LBA for the video frame of the second frame and the audio frame of the second frame in the playback language without adding starting LBAs for the other audio frames of the second frame not in the playback language.

* * * * *